United States Patent [11] 3,620,998

[72] Inventor Carl S. Marvel
 Tucson, Ariz.
[21] Appl. No. 885,276
[22] Filed Dec. 15, 1969
[45] Patented Nov. 16, 1971
[73] Assignee Research Corporation
 New York, N.Y.

[54] DIIMIDAZOLE-ANTHRAQUINONE POLYMERS
 2 Claims, No Drawings
[52] U.S. Cl. .................................................. 260/64,
  117/161, 260/30.8, 260/63, 260/72.5
[51] Int. Cl. ........................................... C08g 15/00,
  C08g 33/02
[50] Field of Search ........................................... 260/64,
  72.5, 63

[56] References Cited
 UNITED STATES PATENTS
3,493,541 2/1970 Gall .............................. 260/72.5

Primary Examiner—William H. Short
Assistant Examiner—L. L. Lee
Attorney—Stowell & Stowell ABSTRACT: Terephthalaldehyde and isophthalaldehyde are condensed with 1,2,5,6-tetraaminoanthraquinone to produce polymers characterized by the presence of an anthraquinone moiety and two imidazole moieties in the repeating unit of the polymer. The polymers are useful in the preparation of heat-resistant articles intended for use at elevated temperatures.

DIIMIDAZOLE-ANTHRAQUINONE POLYMERS

This invention relates to diimidazole-anthraquinone polymer compositions.

The compositions of the present invention are condensed heterocyclic polymers characterized by the presence of an anthraquinone moiety and tow imidazole moieties in the repeating unit of the polymer. These compositions are further characterized by a high degree of thermal stability and stability to oxidation at elevated temperatures making them useful in the preparation of oxidation- and corrosion-resistant articles capable of use at temperatures in excess of 400° C.

More specifically, the polymer compositions of the present invention are characterized by the presence of the following recurring structural units:

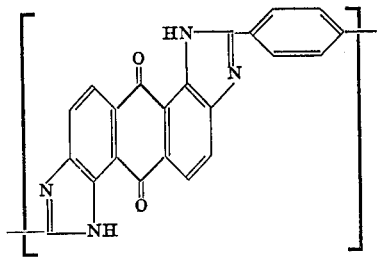

Poly[(1,6,7,12-tetrahydro-6,12-dioxoanthra[1,2-d:5,6-d']diimidazole-2,8-diyl)-p-phenylene].

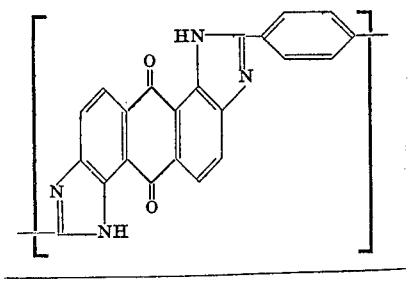

Poly [1,6,7,12-tetrahydro-6,12 -dioxoanthra[1,2-d:5,6-d') diimidazole-2,8-diyl)-m-phenylene].

These polymers are prepared by the polycondensation reaction of 1,2,5,6-tetraminoanthraquinone with terephthalaldehyde or isophthalaldehyde, preferably as their dibisulfite adducts and in the presence of an organic acid catalyst. The polycondensation is best effected by heating equivalent amounts of the reactants in a high-boiling polar solvent such as dimethylacetamide or nitrobenzene. AFter slow warming and preliminary heating at 90° C., the reaction mixture is generally heated at 160° C. for several hours. The material, which precipitates out of the solution during the course of the reaction and/or is precipitated after the reaction, is separated by filtration and then heated at 250°-350° C. for several hours under reduced pressure to drive off any residual solvent and to complete ring closure condensation.

The present invention is further illustrated by means of the following examples which show the preparation of the intermediates utilized and representative polymers according to the invention.

I. INTERMEDIATES

A. 1,2,5,6-Tetraaminoanthraquinone

In a 500-ml. three-necked flask equipped with a heating jacket, a mechanical stirrer and a reflux condenser were placed 100 ml. of glacial acetic acid, 100 ml. of acetic anhydride, 50 g. of 2,6-diaminoanthraquinone, and about 0.5 ml. of concentrated sulfuric acid. The reaction mixture was heated to boiling and refluxed with stirring for 2 hours (the diaminoanthraquinone did not dissolve but changed color during acetylation). The reaction mixture was cooled, filtered and washed with some glacial acetic acid and the solid product dried in a vacuum oven. There was obtained 67 g. of 2,6-diacetaminoanthraquinone as a brown solid. The crude product was purified by recrystallization from acetic acid, nitrobenzene or most readily from dimethylformamide In a 500-ml. three-necked flask, equipped with a mechanical stirrer and a thermometer, was placed 400 g. of concentrated sulfuric acid and 50 g. of potassium nitrate. After cooling in an ice bath, 25 g. of finely divided diacetaminoanthraquinone was added to the vigorously stirred mixture keeping the temperature below 5° C. The diacetamino compound dissolved within 30 minutes and the nitration was continued for 4 hours at 0°-5° C. The reaction mixture was decomposed with excess ice; the solid product was separated by filtration and washed thoroughly until the filtrate was acid free. After drying in a vacuum oven at 60° C., the yellow 1,5-dinitro-2,6-diacetaminoanthraquinone was purified by recrystallization from dimethylsulfoxide.

In a two-necked, 1-liter flask, equipped with a mechanical stirrer, 400 ml. of sulfuric acid was mixed with 200 ml. of water to give 80 percent sulfuric acid. The mixture was cooled and 40 g. of dinitrodiacetaminoanthraquinone added. The flask was then heated to 95° C. and held at this temperature for 90 minutes when hydrolysis was complete. The reaction mixture was poured on 1.5 kg. of ice, the solid product separated by filtration and washed until acid free. 1,5-Dinitro-2,6-diaminoanthraquinone was obtained as a dark brown filter cake.

The still wet cake, prepared as described above, was transferred to a two-necked, 1-liter flask, equipped with a mechanical stirrer. Additional water was added bringing the total weight of the cake plus the water to 400 g. Ninety g. of $Na_2S_9 \cdot H_2O$ was added and the reaction mixture stirred while heated on a steam bath for 1 hour. The mixture turned violet as the reduction proceeded in solid phase. THe flask was cooled, the product separated by filtration and washed several times with distilled water until the filtrate was neutral. The black product was dried in vacuo at 50° C. 25 g. of dinitrodiacetaminoanthraquinone yielded 15 g. of tetraaminoanthraquinone which was purified by rescystallization from boiling acetophenone.

B. Teraphthalaldehyde Dibisulfite Adduct 7.86 g. (0.075 mole) of sodium bisulfite was dissolved in 75 ml. with methanol. Then 5 g. (0.037 mole) of terephthaladehyde was added. After stirring for 60 hours at room temperature, the adduct was separated by filtration, carefully washed with methanol and then ether. After drying at room temperature (0.1 mm. Hg), there was obtained 12.8 g. of the adduct as a high melting white crystalline solid.

C. Isophthalaldehyde Dibisulfite Adduct

The dibisulfite adduct of isophthalaldehyde was prepared as described above for terephthalaldehyde. There was obtained 7.32 g. of the adduct as a high-melting white crystalline solid.

II. POLYMERS

A. Poly [(1,6,7,12-tetrahydro-6,12-dioxoanthra [1,2-d:5,6-d']diimidazole-2,8-diyl)-p-phenylene]

1. Using free aldehyde.

A mixture of 0.8590 g. (0.0033 mole) of 1,2,5,6-tetraaminoanthraquinone and 0.4427 g. (0.0033 mole) of terephthalaldehyde in 80 ml. of dry of dimethylacetamide were refluxed under nitrogen in a three-necked 100-ml. flask equipped with stirrer, gas inlet tube and reflux condenser protected with a drying tube. After 7 hours under nitrogen and two hours in air, the red reaction mixture was poured into 800 ml. of ligroin and filtered. The yield was 0.91 g. (70 percent) of a polymer with an inherent viscosity of 0.26. Inherent viscosities here are generally measured at 0.2 concentration in concentrated sulfuric acid at about 30° C.

The previous reaction was repeated adding 8 ml. of glacial acetic acid to the initial reaction mixture. After 2 hours refluxing under nitrogen, the color changed from violet to red and a precipitate formed. The reaction mixture was refluxed for an additional 2 hours in air and the resultant dark brown solid separated by filtration. The yield was 1.2 g. (93 percent). After drying at 110° C. (0.1 mm. Hg), the inherent viscosity was 0.54; further heating for 7 hours raised the inherent viscosity to 0.79.

2. Using aldehyde-bisulfite adduct.

A mixture of 0.8590 g. (0.0033 mole) of 1,2,5,6-tetraaminoanthraquinone and 1.1295 g. (0.0033 mole) of the dibisulfite adduct of terephthalaldehyde in 88 ml. of dimethylacetamide was stirred under nitrogen for 1 hour each at 25°, 90°, 160° C., and in air for 2 hours at 160° C. The reaction mixture was precipitated into water and filtered. The yield was 1.2 g. (93 percent) of a polymer with an inherent viscosity of 0.17.

An analogous reaction was carried out in 80 ml. of dimethylacetamide and 8 ml. of glacial acetic acid to yield 1.15 g. (89 percent) of a polymer with an inherent viscosity of 0.85.

A reaction analogous to the previous reaction was carried out in 80 ml. of nitrobenzene and 8 ml. of glacial acetic acid to yield 1.2 g. (93 percent) of a polymer with an inherent viscosity of 0.97.

A reaction analogous to the previous reaction was carried out catalyzed with trifluoroacetic acid to yield 1.1 g. (86 percent) of a polymer with an inherent viscosity of 0.48.

B. Poly[1,6,7,12-tetrahydro-6,12-dioxoanthra [1,2-d:5,6-d']diimidazole-2,8-diyl)-m-phenylene].

1. Using free aldehyde.

The reaction of 1,2,5,6-tetraaminoanthraquinone and isophthalaldehyde was carried out in 80 ml. of dimethylacetamide and 8 ml. of glacial acetic acid. After refluxing 2 hours under nitrogen and 3 hours in air, the reaction mixture was filtered to yield 1.12 g. (86 percent) of a polymer with an inherent viscosity of 0.27.

2. Using aldehyde-bisulfite adduct.

In an analogous manner, 1,2,5,6-tetraaminoanthraquinone and the dibisulfite adduct of isophthalaldehyde were reacted in 80 ml. of dimethylacetamide to give 1.1 g. (85 percent) of a polymer with an inherent viscosity of 0.19. Heating 7 hours at 250° C. increased the inherent viscosity to 0.29.

An analogous reaction was carried in 80 ml. of nitrobenzene and 8 ml. of glacial acetic to yield 1.1 g. (85 percent) of a polymer with an inherent viscosity of 0.23. Heating for 7 hours at 250° C. and 3 hours at 310° increased the inherent viscosity to 0.52.

III. FIBER FORMATION

Representative polymers prepared as above were dissolved in concentrated sulfuric acid at 90° C. to form about a 10 percent solution. The warm viscous solution was pressed through a syringe into water and the resultant thread washed several times with water and finally with acetone and dried at 110° C. (0.1 mm. Hg). Fibers so formed are stable and exhibit minimum weight loss on heating to 400° C., and may be mixed with other fibers and woven or knit into heat-resistant fabrics.

I claim:

1. Film and fiber forming polymers consisting of the recurring structural unit:

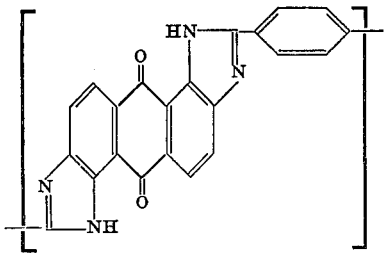

2. Film and fiber forming polymers consisting of the recurring structural unit:

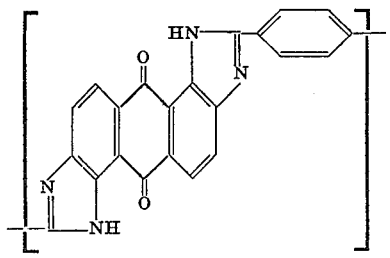

* * * * *